W. E. WHITE & L. K. HOF.
WATER GLASS.
APPLICATION FILED MAR. 14, 1908.
922,829.
Patented May 25, 1909.
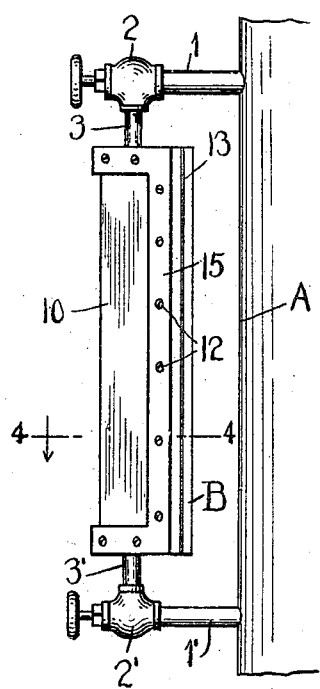
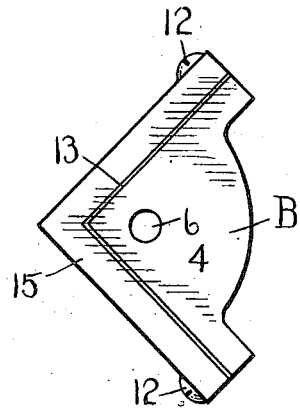
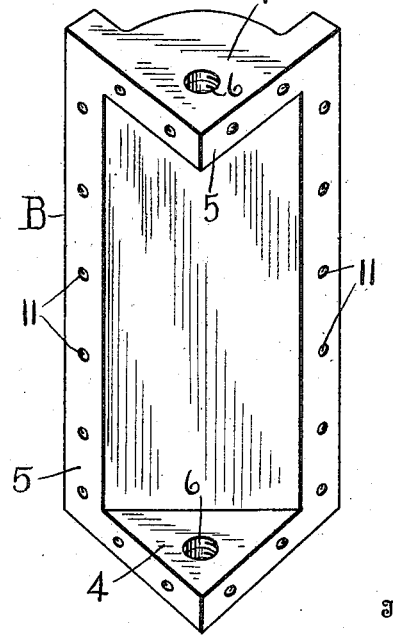
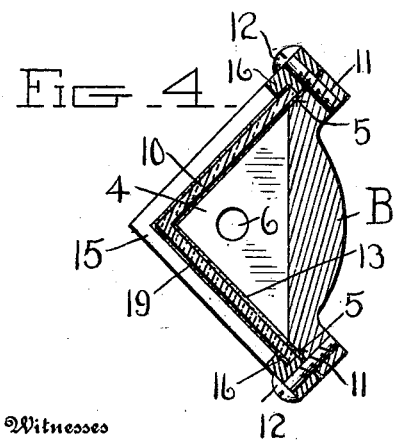
Witnesses
L. B. James
M. J. Miller
Inventors
William E. White
&
Lewis K. Hof
By Randler Randler
Attorneys

UNITED STATES PATENT OFFICE.

WILLIAM E. WHITE AND LEWIS K. HOF, OF LOS ANGELES, CALIFORNIA.

WATER-GLASS.

No. 922,829.  Specification of Letters Patent.  Patented May 25, 1909.

Application filed March 14, 1908. Serial No. 421,255.

*To all whom it may concern:*

Be it known that we, WILLIAM E. WHITE and LEWIS K. HOF, citizens of the United States, residing at Los Angeles, in the county of Los Angeles, State of California, have invented certain new and useful Improvements in Water-Glasses; and we do hereby declare the following to be a full, clear, and exact description of the invention, such as will enable others skilled in the art to which it appertains to make and use the same.

This invention has relation to certain new and useful improvements in water glasses.

The object of our invention is to provide a so called water glass constructed so that the height of water within the boiler may be readily ascertained to disclose the quantity within the boiler. While the glass is especially adapted to be used in connection with steam boilers, the same may be used with other vessels, bins or magazines to disclose the quantity within the receptacle.

A further object of our invention is to provide a water glass of that type having a flat surface, as distinguished from the class of tubular water glasses, so constructed that the gage of water may be seen from many points.

In the accompanying drawings we have shown in Figure 1 a broken portion of a boiler equipped with one of our improved water glasses. Fig. 2 shows an end view of the water glass. Fig. 3 is a front view of the glass housing, and Fig. 4 is a sectional view on line 4, of Fig. 1.

Referring now by numeral to the drawings, A represents a broken portion of a boiler provided with a tube 1 having the valve 2, from which extends the nipple 3, and the tube 1′, valve 2′ and nipple 3′.

Our water glass represents a housing comprising a flat plate having two similar ends 4 and the side flanges 5, as shown in Fig. 4. This construction provides a housing having a back and two faces which are preferably extended at right angles to one another. The ends 4, are perforated and threaded, as shown at 6, to receive the nipples, to provide an intake and exit connection. The glass 10, used in connection with this housing is in the form of a plate bent at right angles, the two faces of this plate snugly fitting upon the face of the housing. The housing is provided with suitable screw perforations 11 to receive the securing screws 12 which are of course made to pass through the flanges 5.

In Fig. 4 the position of this angular glass plate 10 is indicated as resting upon the rubber gasket 13.

In order to properly secure the glass to the housing we use a frame 15 as shown in Fig. 1 which frame is preferably provided with the shoulder 16 adapted to snugly receive the outer rubber gasket 19. This frame also being provided with suitable openings to receive the screws 12. In securing the glass the same is impinged between the gaskets 13 and 19, the frame 15 securely holding the outer gasket 19 while the inner gasket 13 is held by means of the screws 12 as clearly indicated in Fig. 4. Now the water within the boiler will of course show within the bight of this angular water glass and as this water glass projects outward from the boiler, the gage of the water may be readily seen.

And having thus described our said invention, what we claim as new is—

1. An indicator, comprising a housing consisting of a back plate having similar perforated ends and side flanges, a transparent plate bent at an angle, said ends being of a shape to conform to the angle of said transparent plate, a frame secured to said end flanges and side flanges, and having means to secure the transparent plate thereto.

2. An indicator, comprising a housing consisting of a back plate having similar perforated ends and side flanges, a transparent plate bent at a right angle, said ends being of a shape to conform to the angle of said transparent plate, a frame secured to said end flanges and side flanges, and having means to secure the transparent plate thereto.

3. An indicator comprising a housing having a back portion provided with end flanges and side flanges arranged at obtuse angles to said portion, and top and bottom flanges provided with intake and exit openings, a transparent plate bent at an angle to fit said flanges, said ends being of a shape to conform to the angle of said transparent plate, a frame secured to said end flanges and side flanges having means to secure the transparent plate thereto.

In testimony whereof, we affix our signatures, in presence of two witnesses.

WILLIAM E. WHITE.
LEWIS K. HOF.

Witnesses:
  CHARLES ALBERT MINOR,
  LENOX E. DEMING.